United States Patent [19]

Pergrale

[11] Patent Number: 4,922,422

[45] Date of Patent: May 1, 1990

[54] METHOD AND APPARATUS FOR SELECTIVE SUPPRESSION OF PORTIONS OF AN ECHOGRAPHIC SIGNAL TO IMPROVE IMAGE RECONSTRUCTION

[75] Inventor: Jean Pergrale, Paris, France

[73] Assignee: U.S. Philips Corporation, New York, N.Y.

[21] Appl. No.: 183,204

[22] Filed: Apr. 19, 1988

[30] Foreign Application Priority Data

Apr. 21, 1987 [FR] France .................................. 87 05605

[51] Int. Cl.$^5$ .............................................. G06F 15/42
[52] U.S. Cl. ............................ 364/413.16; 364/413.25
[58] Field of Search ...................... 364/413.16, 413.19, 364/413.25

[56] References Cited

U.S. PATENT DOCUMENTS

| 4,112,411 | 9/1978 | Alais et al. ............................ 73/626 |
| 4,351,038 | 9/1982 | Alais ..................................... 73/626 |
| 4,655,228 | 4/1987 | Shimura et al. ..................... 128/660 |
| 4,676,251 | 6/1987 | Bernatets ............................. 73/599 |
| 4,729,019 | 3/1988 | Rouvrais ............................... 382/6 |
| 4,750,367 | 6/1988 | Bernatets ............................. 73/602 |

*Primary Examiner*—Jerry Smith
*Assistant Examiner*—Gail O. Hayes
*Attorney, Agent, or Firm*—William Squire; Jack Haken; Thomas Briody

[57] ABSTRACT

A method of scanning objects by means of ultrasonic echography, including the transmission of ultrasonic waves to the object to be scanned by means of a transducer array (101) and the reception and processing of the echographic signals corresponding to the echoes returned. Digitized A-lines are divided into n elements of p points and, after various operations, the reconstruction of the elements of the echographic lines by selection of principal vectors which imply factors which imply a reconstruction of the matrix sum of the series of unity matrix products relative to said selected principal vectors.

3 Claims, 1 Drawing Sheet

METHOD AND APPARATUS FOR SELECTIVE SUPPRESSION OF PORTIONS OF AN ECHOGRAPHIC SIGNAL TO IMPROVE IMAGE RECONSTRUCTION

FIELD OF THE INVENTION

The invention relates to a method of scanning objects by means of ultrasonic echography, including the transmission of ultrasonic waves to the object to be scanned by means of a transducer array which is for this purpose excited with a given transmission frequency, duration and rhythm, and the reception and processing of the echographic signals which correspond to the echoes returned to said transducer array by the obstacles encountered in the object scanned, which processing of the echographic signals associated with each echographic line of the cross-section in the object scanned includes amplification of said signals, their correction for attenuation effects as a function of time or scanning depth, and their display in order to form a reference image. The invention also relates to an apparatus for performing this method.

BACKGROUND OF THE INVENTION

Despite the advantages of ultrasonic echography, such as the absence of radiation, the ruggedness of existing equipment, etc., the complexity of the interactions between the ultrasonic waves and the objects scanned, being biological tissues in the case of medical echography, and the large number of physical parameters involved, certainly prevent full benefit from being derived from the possibilities of this method for the analysis of said objects.

SUMMARY OF THE INVENTION

It is an object of the invention to propose a method and an ultrasonic echography apparatus which aim to avoid this drawback and which utilize an original method of processing the echographic signals received in order to obtain more readily usable images of the objects scanned.

To achieve this, the method in accordance with the invention is characterized in that said processing also includes the following steps which are successively performed for each echographic line or for spatially neighbouring segments of a group of juxtaposed echographic lines:

(a) analog/digital conversion of the corrected echographic signals, including storage of the signals thus digitized in a first buffer memory;

(b) transformation of the echographic signals, which operation successively includes for each echographic line its sub-division into n elements of p points, said $n \times p$ points being re-arranged in a matrix X comprising n rows and p columns and the storage of this matrix, the calculation and the storage of the matrix product of X and its transposed matrix X', after determination of the mean value of each column of X and subtraction of each term of the matrix from the mean value corresponding to its column, the calculation and storage of the eigenvalues and eigenvectors, of said matrix product including the arrangement of the eigenvalues in an ascending or descending order and, before their supply to a second buffer memory, the reconstruction of the elements of echographic lines by selection of some principal factors, implying a reconstruction of the matrix sum of the series of the unity matrix products relating to said selected principal factors;

(c) digital/analog conversion after storage of the signals thus reconstructed;

(d) display of the converted signals in a way similar to that of the reference image.

The method in accordance with the invention actually makes it possible to extract from complex reception signals any information which is important to the opinion of the user, said information resulting in images which are of the same nature as the conventional images obtained thus far but are easier to interpret.

BRIEF DESCRIPTION OF THE DRAWINGS

The features and advantages of the invention will become apparent from the following description which is given, by way of example, with reference to the accompanying drawings; therein.

DESCRIPTION OF PREFERRED EMBODIMENTS

Figure 1:
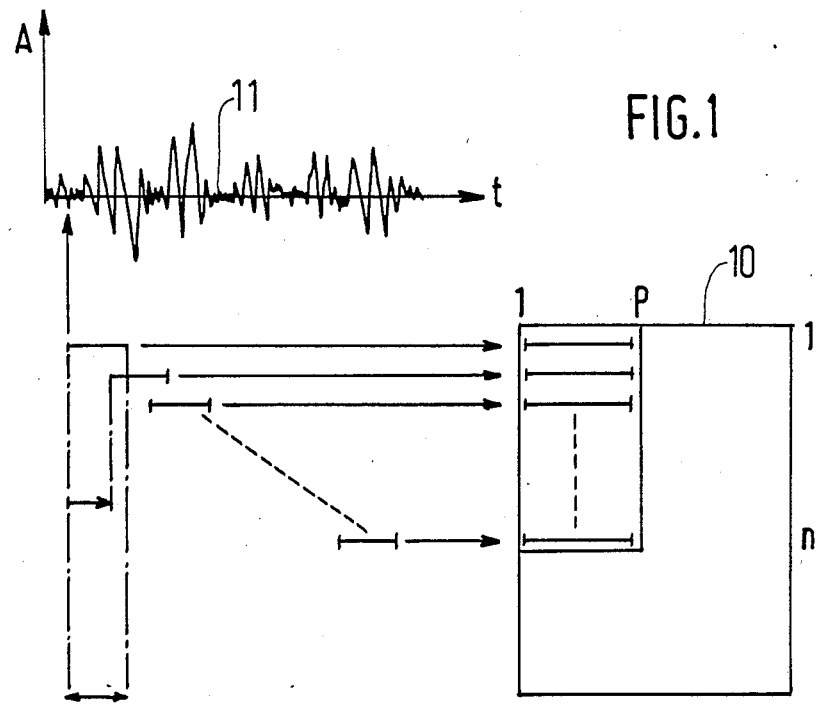
FIG. 1 shows the subdivision of an echographic line and its rearrangement in a matrix comprising $n \times p$ points.

Factorial analysis is a multi-dimensional descriptive statistical method which utilizes adjustment calculations based on linear algebra. Such a method offers synthetic representations of sets of numerical values and the objects to be described actually become points in a multi-dimensional space. The basic principle of the factorial analysis is the search for the reconstruction of a set of $N \times p$ values $x_{ij}$ on the basis of a small number of these values.

Subsidiarily, such an analysis method does not enable the reconstruction of the complete set of $n \times p$ values, but rather the determination of $q \times (n+p)$ values thereof, be it subject to the relation $q \times (n+p) < n \times p$. Thus, it actually constitutes a data compression technique if q is sufficiently small.

The general principle is as follows. Assume that a matrix X with n rows and p columns is to be reconstructed on the basis of a number of digital values which is smaller than $n \times p$, the reconstruction of X with $q \times (n+p)$ values is then possible if q vector columns with n components and q vector columns with p components, denoted by U and V, respectively can be found so that $X = uv$. In that case the np values of X have been reconstructed exclusively by means of $n+p$ digital values, which is the simplest decomposition.

The problem thus solved can be geometrically interpreted in a space $R^p$ having p dimensions. The n rows of X can be considered to be the coordinates of a set of n points of this space, referred to hereinafter as a cloud. If this cloud of points is entirely contained in a vectorial subspace $R^q$ of $R^p$, the positions of the n points can be recovered on the basis of their coordinates on the q new axes of this subspace and on the basis of the components of these new axes.

The adjusting process utilizing a vectorial subspace in $R^p$ can be carried out as follows. First a search is made for the straight line $F_1$ which passes through the origin of the p axes which define $R^p$ and which at the same time best adjust the cloud of n points representing the lines of X in $R^p$. If $M_1$ is the point of $R^p$ which represents the first line of X, and if u is the unity vector relative to the straight line $F_1$ so that $u'u = 1$ or $$\sum_{i=1}^{i=p} u_i^2 = 1$$

the n lines of the vector column Xu are the n scale products of these points with u and hence represent the lengths of the segments determined by projection of these n points on the straight line $F_1$.

In order to ensure that the straight line is the best adjustment for the cloud of n points, therefore, the sum of these segments $\Sigma\ M_j H_j^2$ (j varying from 1 to n), in which expression $M_1, M_2, \ldots M_n$ are the n points of $R^p$ representing the lines of X and $H_1, H_2, \ldots H_n$ represent their projection on the straight line $F_1$, must be minimized. Because the expression $\Sigma\ OM_j^2$ is fixed (O being the origin of the p axes in $R^p$), making the expression $\Sigma\ M_j H_j^2$ minimum actually means making the expression $\Sigma\ OH_j^2$ maximum, which means looking for the unity vector u which renders the quantity (Xu) Xu=u'X'Xu (X'=transposition of X) maximum.

It could be demonstrated in a detailed manner, that this one-dimensional optimum vectorial subspace, referred to as $u_1$, which offers the best adjustment, in the least squares sense, for the cloud of the n points, exists. It could also be demonstrated that the best two-dimensional vectorial subspace providing this adjustment also exists and that it contains $u_1$. Thus subspace is found by looking for the unity vector $u_2$, orthogonal to $u_1$ (that is to say so that $u_2'u_1=0$ and $u_2'u_2=1$) which makes the square form $u_2'X'Xu_2$ maximum. Analogously, it appears that the optimum q-dimensional vectorial subspace (where q is smaller than or equal to p) is generated by the vectors $u_1, u_2, u_3, \ldots, U_{q-1}, U_q$, where Uq is orthogonal to $u_1, u_2, u_3, \ldots U_{q-1}$, and makes the square from $u_q'X'X_{uq}$ maximum, where $u_q'u_q=1$.

It can also be demonstrated that $u_1$ is the eigenvector of the matrix X'X which has the highest eigenvalue $\lambda_1$, and the same for $u_2, u_3$, etc. with the eigenvalues $\lambda_2, \lambda_3, \ldots, \lambda q$, considering the $\lambda_2$ is the eigenvalue directly smaller than or equal to $\lambda_1$, $\lambda_3$ being the eigenvalue directly smaller than or equal to $\lambda_2$, and so on. Finally, the q normalized eigenvectors corresponding to the q largest eigenvalues of the symmetrical matrix X'X constitute an ortho-normalized base of the vectorial subspace $R^q$ of $R^p$ which is adjusted best to the cloud of n points.

The foregoing demonstration can be repeated in a similar way for a space having n dimensions $R^n$; the p columns of X may then be considered as the coordinates of a set (or cloud), or p points of this space. Moreover, it is also found that an ortho-normalized base of the q-dimensional vectorial subspace which is adjusted best, in the least squares sense, to the set of p points is formed by q eigenvectors $v_1, v_2, v_3, \ldots, v_{q-1}$, vq corresponding to the q largest eigenvalues $\mu_1, \mu_2, \mu_3, \ldots, \mu_{q-1}, \mu q$ of the symmetrical matrix XX', where the vector pursued must make the square form v'XX'v, where v'v=1, maximum.

Finally, it is demonstrated that, regardless of whether $\alpha$ is smaller than or equal to the rank r of X and hence of XX', the following relations exist:

$$u_\alpha = \frac{1}{\sqrt{\lambda_\alpha}} X'v_\alpha$$

$$v_\alpha = \frac{1}{\sqrt{\lambda_\alpha}} Xu_\alpha$$

-continued $$\lambda_\alpha = \mu_\alpha$$

An approximation X* of the digital data table X is thus given by the expression:

$$X^* = \sum_{\alpha=1}^{\alpha=q} \sqrt{\lambda_\alpha}\ v_\alpha u'_\alpha = \sum_{\alpha=1}^{\alpha=q} (Xu_\alpha)\ u'_\alpha$$

This expression shows that the term $Xu_\alpha$ actually represents the weight of the vector $u_\alpha$ in the approximation of X. The calculation of the various terms $Xu_\alpha$ thus reveals the relative importance of such a vector in said reconstruction.

The factorial analysis described will be applied to ultrasonic echography. Actually, the various physical laws involved in an echographic process unfortunately lead to equations which are very difficult to use because of the extreme entanglement of the various parameters concerned. Thus, the use of the echographic images depends essentially on the experience of observers, physicians, etc. The application of the factorial analysis to echography enables more objective processing of the echographic data.

It is known that the interaction between longitudinal ultrasonic waves transmitted by an ultrasonic transducer (or transducer array) and biological tissues enables the formation of images of these tissues and notably all of the interfaces between comparatively homogeneous zones of these tissues. The echoes returned by these interfaces, marking changes of the acoustic impedance, can actually be detected, after which they can be processed so as to localize the zones wherefrom the echoes originate, taking into account notably the direction of the waves and the time of arrival of the wave fronts. Thus, the sequential scanning of a cross-section of the tissues suffices on order to form an echographic image on the basis of echographic lines successively recorded during progressive displacement of the ultrasonic transducer on the patient.

More specifically, an ultrasonic image is traditionally reconstructed, for each of the constituent lines, on the basis of the envelope of the data corresponding to each of said echographic lines. In order to avoid the loss of amplitude and phase information, resulting from the determination of the envelopes, factorial analysis will be applied, be it not to the overall image but to each of the echographic lines before determination of the envelope, said overall image being ultimately reconstructed on the basis of the lines processed by factorial analysis in order to derive the essential information therefrom.

The processing method in accordance with the invention is as follows. Each of the echographic lines, representing (in the representation mode which is referred to as the mode A) the amplitude of the echoes received as a function of the time expired or the distance or the depth of the tissues, is subdivided into elements of the same length which may be either juxtaposed or overlapping. For example, a line is sampled at 2048 points, corresponding to an exploration depth of 6.4 cm, and is sub-divided into 32 juxtaposed elements of 64 points. The principle of the factorial analysis applied in this case consists in the construction, on the basis of such a sub-division, of the table of data on which the analysis will be performed and to perform this analysis.

FIG. 1 illustrates the sub-division of the echographic lines and the formation of the data table. The sub-division into n=32 elements of p=64 points each takes place by forming a table 10 with n rows of p points each. The starting point for the table 10 is the first point of the echographic line 11. The length of 64 points per matrix row of the data table is retained herein as it is the order of the length of the incident ultrasonic pulse, but a shorter or, preferably, longer length may also be chosen. In the present case, however, a line step equal to the number of points per element, in this case 64, is chosen. Thus, it will suffice to juxtapose the rows of the matrix processed by factorial analysis in order to reconstruct an image corresponding to the totality of the n×p points of the original echographic line.

As has already been stated, the reconstruction of the initial data table is given by an expression comprising the products of the type Xuu′, the reconstruction of one of the n elements on the basis of the new base having q dimensions being actually realized by the formation of the sum of the products Xuu′ relative to the eigenvalues retained. The suppression, during said reconstruction, of one or several of these products means a correlative selection of the information which is to be especially conserved. By subsequently treating the lines (this reconstructed) as normal echographic lines, an image of the same nature as a conventional image will be formed, be it that given components have been voluntarily eliminated therein. The application of such a method enables, for example, the elimination of original echographic signals which correspond to noise, thus enabling images to be obtained which can be more readily interpreted; this has proved to be particularly useful in medical applications.

Preferably, the method of processing echographic signals is performed in the following steps:

(1) reception and sampling of an echographic line, including the marking of its position, and the storage in a memory of the resultant sampling signals and the position parameters;

(2) rearrangement of the data in accordance with the selected sub-division, in order to form the matrix X, and the storage of this matrix in a memory;

(3) calculation of the mean value of each column of the matrix X and subtraction of each of the terms of the matrix from the mean value corresponding to its column;

(4) calculation and storage in a memory of the matrix product X′X;

(5) calculation and storage in a memory of the eigenvalues and the associated eigenvectors, in the present case by means of an iterative algorithm utilizing the Jacobi method, the storage in a memory being performed only after classification, for example, in a descending order of the eigenvalues;

(6) reconstruction of the elements of the echographic lines on the basis of some selected principal factors, by reconstruction of the matrix sum of the products Xuu′ relative to the factors chosen, addition of the mean value previously calculated for each column to each element of the matrix thus obtained, and rearrangement of the rows of the matrix in order to reconstruct the echographic line;

(7) determination and storage of the envelope of the echographic line in a memory;

(8) display on the basis of said envelopes, with notably interpolation between said envelopes.

Figure 2:
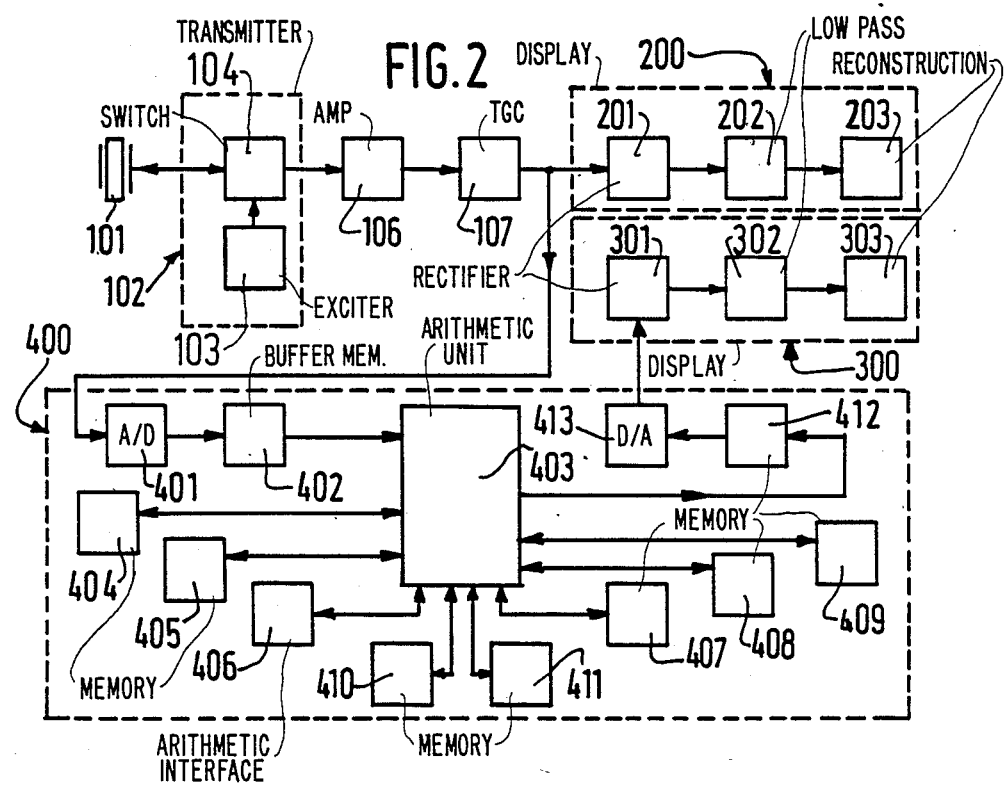
FIG. 2 shows an embodiment of an apparatus in accordance with the invention.

A preferred embodiment of an ultrasonic echograph for carrying out the above method will now be described. In the embodiment shown in FIG. 2, the apparatus for the scanning of objects in accordance with the invention comprises, on the one hand conventional elements such as the transducer array, the transmitter stage and, in the receiver and processing stage, the display device, and on the other hand original elements such as a device for the processing of echographic signals which is included in said receiver stage, parallel to the display device.

More specifically, the apparatus in accordance with the invention in this case comprises an ultrasonic transducer 101 whose excitation is controlled by a transmitter stage 102 which essentially consists of a transducer excitation circuit 103 and a switching circuit 104. An internal clock of the transmitter stage defines the rhythm and the frequency of the transmission of the ultrasonic waves by the transducer, and also defines the duration of the transmission and reception periods. For transmission, the excitation circuit 103 and the transducer 101 are connected via the switching circuit 104 which occupies the transmission position. During reception, the echographic signals supplied by the transducer in response to the echoes received are applied, via the switching circuit 104 which now occupies the reception position, to the receiver stage which successively comprises an amplifier 106, a TGC (Time-Gain-Compensation) circuit 107 for correcting the attenuation of the ultrasonic waves in the objects traversed (actually, an amplifier having a gain which increases as a function of time) and, in two parallel channels, the display device of a known type and the processing device in accordance with the invention.

The display device is denoted by the reference numeral 200 and in this case comprises a rectifier 201, a low-pass filter 202 and a stage 203 which includes all circuits necessary for the reconstruction of an image on the basis of the data supplied for each of the echographic lines concerning the cross-section scanned. A display device of this kind is customarily used in an echograph so that said circuits will not be described in detail.

The processing device in accordance with the invention comprises an arithmetic device 400 which is followed by a display device 300 which resembles the device 200 and which is composed of circuits 301, 302, 303 which are identical to the circuits 201, 202, 203. The arithmetic device 400 comprises first of all a fast A/D converter 401, for example an 8-bit/20 MHz converter such as the converter 1048 from TRW, La Jolla, CA 92038, USA. The converter 401 is followed by a first buffer memory 402 which enables the storage, before processing, of the set of signals concerning the echographic lines of the cross-section scanned.

A programmable arithmetic unit 403 receives the output of the buffer memroy 402. Around this arithmetic unit, being, for example, a microprocessor 68020 from Motorola, 1303 East Algonquin Road, Schaumburg, Ill. 60196, USA, there are provided a working memory 404, a memory 405 for storing the processing programs, an interface 406 between the operator and the arithmetic unit which constitutes an input/output member for selecting the parameters involved in the processing, a memory 410 for storing these parameters, a first memory 407 with matrix addressing for the storage, in the form of a matrix, of each echographic line being processed, a memory 411 for storing the mean values of each column of the matrix stored in the memory 407, an intermediate memory 408 for storing the eigenvalues and the eigenvectors relative to the processing of an echographic line, a second memory 409 with matrix addressing for the storage of the signals resulting from the partial recombinations of the echographic lines performed in order to reconstruct these lines on the basis of some principal factors which are chosen by the operator on the basis of his experience with the interpretation of images and which govern the information to be displayed in view of the reference image, and a second buffer memory 412 which enables the storage of the reconstructed echographic lines after their processing. To the output of this buffer memory 412 there is connected a D/A converter 413, the output signals of which are applied to the display device 300.

The operation of the described apparatus is essentially as follows. After mechanical scanning or electronic scanning, corresponding to a given cross-section in the object to the scanned, the echographic lines available on the output of the circuit 107 for correcting attenuation effects follow two parallel paths. On the one hand, these signals are applied to the display device 200, of a conventional type as has already been stated, for the formation of a traditional reference image. On the other hand, the same signals are received by the arithmetic device 400 which first digitizes the echographic lines, in the converter 401, followed by their storage in the first buffer memory 402. After this preliminary treatment, the echographic lines are treated one after the other.

As a result of the processing software stored in the memory 405 for the processing programs, each echographic line is first sub-divided, after which it is placed in the form of a matrix X in the first memory 407 with matrix addressing. The software stored in the memory 405 performs as its essential functions the subtraction of each element of X from the mean value corresponding to the column of X in which this element is situated (this mean value is stored in memory 411), the matrix product XX', the calculation of the eigenvalues and eigenvectors of the matrix thus obtained, the arrangement of these eigenvalues (for example, in the descending order of eigenvalues), and the storage of these eigenvalues and eigenvectors. As a function of the numbers of the principal factors chosen by the operator (and stored in the memory 410 for storing the parameters), the software then also forms the corresponding products Xuu', followed by the addition of these products and their storage in the second memory 409 with matrix addressing.

To each element of the new matrix thus formed there is added the mean value stored in the memory 411 and corresponding to its column. Finally, each echographic line is reconstructed by an inverse realignment operation with respect to the initial sub-division operation and the matrixing, followed by storage in the second buffer memory 412 before being applied, via the D/A converter 413, to the display device 300.

It is to be understood that the invention is not restricted to the embodiment described and that various alternatives can be proposed without departing from the scope of the invention. Actually, the apparatus which is described herein and which operates with the aid of a microprocessor for the execution of given functions is not the only feasible version. It will be apparent that instead of the above software use can alternatively be made of digital circuits which perform each of these steps; however, this is at the expense of increased complexity. The first and the second display device of the receiver and processing stage can be combined in the same assembly or display stage. Finally, it is to be noted that the invention has been described for the processing of an echographic line which is subsequently sub-divided into segments; however, these segments may alternatively originate from different echographic lines and may be, for example, spatially neighbouring segments of a set of successive echographic lines.

What is claimed is:

1. In a method of scanning objects by means of ultrasonic echography, which includes the transmission of ultrasonic waves to the object to be scanned by means of a transducer array which is for this purpose excited with a given transmission frequency, duration and rhythm, and the reception and processing of the echographic signals which correspond to the echoes returned to said transducer array by the obstacles encountered in the object scanned, which processing of the echographic signs associated with each echographic line of the cross-section in the object scanned includes amplification of said signals, their correction for attenuation effects as a function of time or scanning depth, and their display in order to form a reference image, the improvement wherein said processing also includes the successive steps of, for each echographic line or for spatially neighbouring segments of a group of juxtaposed echographic lines:

(a) analog/digital conversion of the corrected echographic signals including storage of the signals thus digitized in a first buffer memory;

(b) transformation of the echographic signals, which operation successively includes for each echographic line its sub-division into n elements of p points, said n×p points being rearranged in a matrix X comprising n rows and p columns and the storage of this matrix, the calculation and the storage of the matrix product of X and its transposed matrix X', after determination of the mean value of each column of X and subtraction of each term of the matrix from the mean value corresponding to its column, the calculation and storage of the eigenvalues and eigenvectors of said matrix product, including the arrangement of the eigenvalues in an ascending or descending order and, the reconstruction of the elements of the echographic lines by selection of principal factors, which imply a reconstruction of the matrix sum of the series of unit matrix products relating to said selected principal factors;

(c) digital/analog conversion after storage of the signals thus reconstructed;

(d) display of the converted signals in a way similar to that of the reference image.

2. In a apparatus for scanning objects by means of ultrasonic echography, comprising a transducer array which is connected to a transmitter stage for the transmission of ultrasonic waves to the object to be scanned and to a receiver and processing stage for the echoes returned to said transducer array by the obstacles encountered by the ultrasonic waves in the object scanned, which receiver and processing stage receives the echographic signals associated with each echographic line of the cross-section in the object scanned and comprises at least an amplifier, a circuit for correcting attenuation effects of the ultrasonic waves in the object scanned, and a first display device which receives the corrected signals present on the output of said circuit: the improvement wherein said receiver stage also comprises, connected in parallel to the first display device, an arithmetic device followed by a second display device, which arithmetic device comprises an A/D converter, a first buffer memory for storing said corrected echographic signals, means for transforming, on echographic line after the other, these corrected echographic signals, a second buffer memory for storing the transformed echographic signals, a D/A converter, and a second display device, said means for performing successively, for each echographic line or for a line formed by spatially neighbouring segments of a group of juxtaposed echographic lines, the sub-division thereof into n elements of p points, with re-arrangement of said n×p points in a matrix X consisting of n lines and p columns, and the storage of said matrix, the calculation and storage of the matrix product of X and its transposed matrix X', after determination of the means value of each column of X and subtraction of each term of the matrix from the mean value corresponding to its column, the calculation and storage of the eigenvalues and eigenvectors of said matrix product, with arrangement of the eigenvalues according to an ascending or descending order and, the reconstruction of the elements of echographic lines by selection of principal factors, which imply a reconstruction of the matrix sum of the series of unity matrix products relative to said selected principal factors.

3. An apparatus as claimed in claim 2, characterized in that the first and second display device are included in a common display stage.

* * * * *